(12) United States Patent
Hagvall et al.

(10) Patent No.: US 11,702,099 B2
(45) Date of Patent: Jul. 18, 2023

(54) METHOD FOR QUANTIFYING VEHICLE PATH FOLLOWING PERFORMANCE

(71) Applicant: VOLVO TRUCK CORPORATION, Gothenburg (SE)

(72) Inventors: Linus Hagvall, Gothenburg (SE); Emil Klintberg, Torslanda (SE); Oskar Wigström, Gothenburg (SE); Fredrik Sandblom, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/632,749

(22) PCT Filed: Aug. 23, 2019

(86) PCT No.: PCT/EP2019/072620
§ 371 (c)(1),
(2) Date: Feb. 3, 2022

(87) PCT Pub. No.: WO2021/037330
PCT Pub. Date: Mar. 4, 2021

(65) Prior Publication Data
US 2022/0289232 A1  Sep. 15, 2022

(51) Int. Cl.
*B60W 60/00* (2020.01)
*B60W 40/068* (2012.01)
(Continued)

(52) U.S. Cl.
CPC ........ *B60W 60/001* (2020.02); *B60W 40/068* (2013.01); *B60W 40/107* (2013.01); *B60W 40/109* (2013.01); *G07C 5/02* (2013.01);
*B60W 2520/06* (2013.01); *B60W 2520/105* (2013.01); *B60W 2520/125* (2013.01); *B60W 2555/20* (2020.02)

(58) Field of Classification Search
CPC .... B60W 60/001; B60W 2555/20; G07C 5/02
See application file for complete search history.

(56) References Cited

U.S. PATENT DOCUMENTS

| 2014/0149325 A1 | 5/2014 | Clifton et al. |
| 2019/0094867 A1 | 3/2019 | Vernaza et al. |

OTHER PUBLICATIONS

AslJung et al, "Comparing Collision Threat Measures for Verification of Autonomous Vehicles using Extreme Value Theory", 2016, IFAC (International Federations of Automatic Control) (Year: 2016).*

(Continued)

*Primary Examiner* — Peter D Nolan
*Assistant Examiner* — Kenneth M Dunne
(74) *Attorney, Agent, or Firm* — Venable LLP; Jeffri A. Kaminski

(57) ABSTRACT

A method for quantifying vehicle path following performance, the method comprising; obtaining samples of path following performance (I), selecting a subset of the path following performance samples such that the selected samples follow a pre-determined statistical extreme value distribution, parameterizing the pre-determined statistical extreme value distribution based on the selected samples of path following performance, and quantifying vehicle path following performance based on the parameterized statistical extreme value distribution.

17 Claims, 4 Drawing Sheets

(51) Int. Cl.
  *B60W 40/107* (2012.01)
  *B60W 40/109* (2012.01)
  *G07C 5/02* (2006.01)

(56) References Cited

OTHER PUBLICATIONS

Asljung Daniel et al: "Using Extreme Value Theory for Vehicle Level Safety Validation and Implications for Autonomous Vehicles", IEEE Transactions on Intelligent Vehicles, IEEE, vol. 2, No. 4, Dec. 1, 2017 (Dec. 1, 2017), pp. 288-297, XP011675264.

Federico Orsini et al: "Collision prediction in roundabouts: a comparative study of extreme value theory approaches", Transportmetrica A: Transport Science, vol. 15. No. 2. Sep. 5, 2018 (Sep. 5, 2018), pp. 556-572, XP055692829.

Junietz Philipp et al: "Criticality Metric for the Safety Validation of Automated Driving using Model Predictive Trajectory Optimization", 2018 21st International Conference on Intelligent Transportation Systems (ITSC), IEEE, Nov. 4, 2018 (Nov. 4, 2018), pp. 60-65, XP033470005.

Krzysztof Czarnecki: "Operational Design Domain for Automated Driving Systems—Taxonomy of Basic Terms", Jul. 21, 2018 (Jul. 21, 2018), XP055692890, URL:https://www.researchgate.net/profile/Krzysztof_Czarnecki3/publication/326543176Operational_Design_Domain_for_Automated_Driving_Systems_-_Taxonomy_of_Basic_Terms/links/5b5404d345851507a7bbe6fl/Operational-D esign-Domain-for-Automated-Driving-Systems-Taxonomy-of-Basic-Terms.pdf [retrieved on May 7, 2020].

Farah Haneen et al: "Safety analysis of passing maneuvers using extreme value theory", IATSS Research, Elsevier, Amsterdam, NL, vol. 41, No. 1, Jul. 25, 2016 (Jul. 25, 2016), pp. 12-21, XP029975275.

International Search Report and Written Opinion dated May 18, 2020 in corresponding International PCT Application No. PCT/EP2019/072620, 14 pages.

Craig Schlenoff et al., "Performance evaluation of autonomous vehicle navigation in dynamic, on-road environments", Integrated Computer-Aided Engineering, vol. 12, No. 3, Jun. 21, 2005 (Jun. 21, 2005), pp. 263-277, XP055719661.

Wang Rongrong et al: "Robust $H_{\infty}$ Path Following Control for Autonomous Ground Vehicles With Delay and Data Dropout",IEEE Transactions on Intelligent Transportation Systems, IEEE, Piscataway, NJ, USA,vol. 17, No. 7, Jul. 1, 2016 (Jul. 1, 2016), pp. 2042-2050, XP011615298, ISSN: 1524-9050, 001: 10.1109/TITS.2015.2498157 [retrieved on Jun. 24, 2016].

Rootzen H., et al., "Multivariate generalized Pareto distributions", Bernoulli 12(5), 2006, 917-930.

International Preliminary Report on Patentability dated Dec. 1, 2021 in corresponding International PCT Application No. PCT/EP2019/072620, 16 pages.

European Communication dated Apr. 26, 2023 in corresponding European Patent Application No. 19758967.4, 8 pages.

Kothari, M., Postlethwaite, I. A Probabilistically Robust Path Planning Algorithm for UAVs Using Rapidly-Exploring Random Trees. J Intell Robot Syst 71, 231-253 (2013).

Das, B., Ghosh, S. Detecting tail behavior: mean excess plots with confidence bounds. Extremes 19, 325-349 (2016).

* cited by examiner $$p_i{}_{i=1}^{n-1},$$

METHOD FOR QUANTIFYING VEHICLE PATH FOLLOWING PERFORMANCE

CROSS-REFERENCE TO RELATED APPLICATIONS

This application is a U.S. National Stage application of PCT/EP2019/072620, filed Aug. 23, 2019 and published on Mar. 4, 2021, as WO 2021/037330 A1, all of which is hereby incorporated by reference in its entirety.

TECHNICAL FIELD

The present disclosure relates to methods, control units and vehicles for quantifying vehicle path following performance. The methods disclosed herein find applications in, e.g., autonomous drive, advanced driver assistance systems, and other safety critical vehicle functions.

The invention can be applied in heavy-duty vehicles, such as trucks, semi-trailers and construction equipment. Although the invention will be described mainly with respect to a cargo transport type vehicle, the invention is not restricted to this particular vehicle, but may also be used in other types of vehicles such as in construction equipment, busses and also in cars.

BACKGROUND

Autonomous drive systems and other advanced driver assistance systems (ADAS) constantly make decisions on how to control an ego vehicle in order to fulfil a given objective while not subjecting the vehicle to risk. These decisions are based on a wide variety of different factors related both to the state of the ego vehicle but also to the surrounding environment and to the ability of the vehicles to perform different types of maneuvers.

When controlling a vehicle there are always uncertainties which need to be accounted for in order to not subject the vehicle to risk. These uncertainties include both uncertain vehicle state estimation and vehicle actuation uncertainties.

When performing vehicle trajectory planning there is typically a need to understand how well different types of paths can be followed with a particular vehicle combination. Therefore, extensive testing is often performed using different types of vehicles to perform different types of maneuvers in different conditions. Path following performance for a given vehicle type and maneuver is then evaluated and modelled based on observations of, e.g., how well the vehicles were able to perform the different maneuvers.

A problem with basing vehicle path following performance modelling on observations is that a lot of data is required in order to accurately model rare events, such as vehicle skidding, control loss, jack-knifing, and the like. Gathering such large quantities of data is both costly and time consuming and may in some cases not even be feasible from a practical point of view.

There is a need for improved methods of quantifying path following performance which allow efficient modelling of rare events in a reliable manner.

SUMMARY

It is an object of the present disclosure to provide methods for quantifying and modelling vehicle path following performance. This object is obtained by a method for quantifying vehicle path following performance. The method comprises obtaining samples of path following performance $p_{i_{j=1}}^{n-1}$, selecting a subset of the path following performance samples such that the selected samples follow a pre-determined statistical extreme value distribution, parameterizing the pre-determined statistical extreme value distribution based on the selected samples of path following performance, and quantifying vehicle path following performance based on the parameterized statistical extreme value distribution.

An important feature of the disclosed method is that the required amount of data that is needed in order to quantify vehicle path following performance is reduced. By allowing modelling of path following performance based on a reduced set of data, development and testing time is reduced, which is an advantage. Also, some types of analysis which were previously not possible to perform since they simply required too much data is now enabled by the disclosed methods.

The disclosed methods are applicable for both off-line and/or on-line processing, which is an advantage. On-line processing may, e.g., be used to complement more extensive off-line processing, leading to improved model verification and thus improved vehicle operation.

The pre-determined statistical extreme value distribution may, e.g., be a Generalized Pareto Distribution (GDP) or a Generalized Extreme Value distribution (GEV). These types of extreme value distributions have been extensively studied, which means that the disclosed methods can make use of well-known and robust analysis techniques, which is an advantage.

According to aspects, the method comprises measuring a time between exceedances metric indicating the time passed between path following performance samples exceeding a threshold $\zeta$, and monitoring operational design domain (ODD) based on the time between exceedances metric. This is a relatively simple metric to determine, yet it is a powerful indicator of when a vehicle is operating outside its ODD.

According to some examples, a sample of vehicle path following performance comprises any of; lateral vehicle position, longitudinal vehicle position, absolute or squared vehicle position, lateral vehicle velocity, longitudinal vehicle velocity, absolute or squared vehicle velocity, lateral vehicle acceleration, longitudinal vehicle acceleration, vehicle acceleration, absolute or squared vehicle acceleration, curvature, yaw rate, heading, and articulation angle. Notably, these quantities are examples, several additional examples can of course be given.

According to aspects, a sample of vehicle path following performance is determined separately for one or more parts of the vehicle. Different parts of the vehicle may be associated with different extreme value distributions, i.e., a trailer may not behave exactly like a tractor vehicle and should therefore preferably be treated separately from the tractor. Also, different axles on a vehicle, or different sets of wheels, may behave differently. By using separate samples of vehicle path following performance for different parts of a vehicle a more refined analysis can be conducted.

A sample of vehicle path following performance may, for example, be obtained dependent on any of; type of vehicle, type of vehicle combination, vehicle physical dimension parameters, weather condition, road friction, road geometry, and path trajectory geometry.

According to some aspects, the method also comprises quantifying the path following performance as a bounded model by bounding the performance to lie within a range $-\overline{w} \leq b_k \leq \overline{w}$ with probability greater than $1-\gamma$, based on the pre-determined statistical extreme value distribution.

Bounds on path following performance enable risk assessment of various driving scenarios, both off-line and in real time. The bounded models obtained from the disclosed methods can also be used to decide, e.g., when to trigger an emergency maneuver by the vehicle.

According to some other aspects, the method further comprises determining a confidence value β associated with the pre-determined statistical extreme value distribution.

This confidence value will be discussed in more detail below. It indicates the confidence obtained in the parameterized GEV or GDP, i.e., if the GEV or GDP can be accurately fitted to the available data or if more data is needed for a good fit.

According to some further aspects, the method comprises assessing a sufficiency of gathered path following performance data for vehicle modelling based on the confidence value β associated with the pre-determined statistical extreme value distribution.

The methods disclosed herein also enable providing constructive feedback on when data collection for a given purpose is done, e.g., when a sufficient amount of data has been collected for quantifying path following performance in some scenario. For instance, according to aspects, the method comprises assessing a sufficiency of gathered model data for model correctness verification based on the confidence value β associated with the parameterized GEV or GDP.

The disclosed methods may optionally also comprise monitoring an operational design domain (ODD) associated with the vehicle by comparing the parameterized statistical extreme value distribution to a set of baseline distribution parameters, wherein operation outside the ODD is indicated by a difference between the parameterized statistical extreme value distribution parameters and the baseline distribution parameters.

In other words, yet another feature of the disclosed methods is that intermediate results can be used to construct a monitor of at least part of the ODD. These particular aspects are also applicable as a foundation for independent stand-alone methods not depending on the above discussed methods. Consequently, there is disclosed herein a method for monitoring an ODD associated with a vehicle. The method comprises obtaining a parameterized GEV or GDP from samples of vehicle path following performance during vehicle operation, like described herein or in some other way. The method also comprises monitoring an ODD associated with the vehicle by comparing the parameterized GEV or GDP to a set of baseline GEV or GDP parameters, wherein operation outside the ODD is indicated by a difference between parameterized GEV or GDP parameters and baseline parameters.

There are furthermore disclosed herein control units, computer programs and vehicles associated with the same advantages as discussed above in connection to the different methods.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
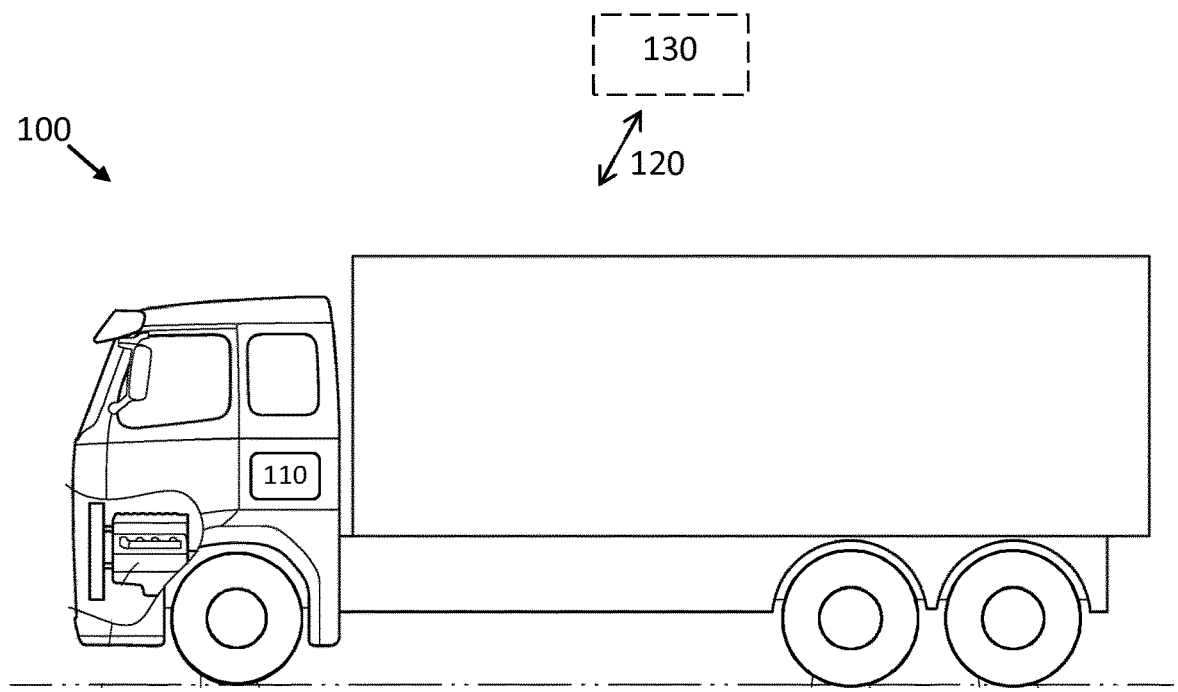
FIG. 1 schematically illustrates a vehicle.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates a vehicle 100 comprising a control unit 110. The control unit 110 may implement various types of support systems and systems for vehicle functional safety, such as advanced driver assistance systems (ADAS) and functions for autonomous drive (AD).

The vehicle may be connected 120 to a processing device 130 arranged to perform off-line calculations to assist the vehicle control system comprising the control unit 110. The connection 120 is preferably wireless but may also be a wireline connection or a connection via some storage module such as a hard drive or the like.

One example function that the control unit 110, and potentially also the processing device 130, may support is the planning and execution of a situation avoidance maneuver (SAM). A safe stop maneuver is an example of a SAM. However, SAMs may also comprise maintaining a constant velocity in a given lane or performing an obstacle avoidance maneuver. In general, the class of situation avoidance maneuvers comprise all maneuvers which can be executed to avoid undesired situations, such as detected risk situations. A SAM may however also relate to, e.g., a difficult parking situation or the like.

Figure 2:
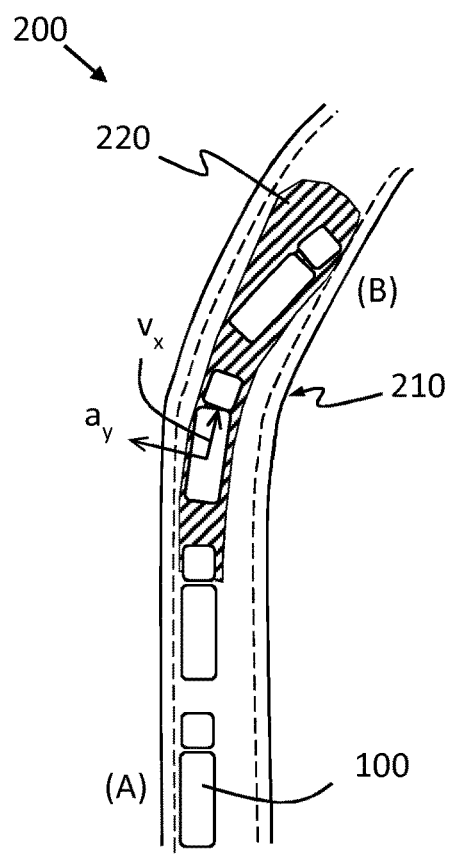
FIG. 2 illustrates an example situation avoidance maneuver by a vehicle.

FIG. 2 illustrates an example SAM 200. The vehicle 100 detects at point A that something is wrong and that the vehicle needs to execute a safe stop maneuver.

For instance, the vehicle 100 may have experienced some type of sensor failure at point A, such as radar system failure or a camera malfunction condition.

The example SAM illustrated in FIG. 2 comprises moving the vehicle 100 to the side of the road 210 and stopping the vehicle in a controlled manner at point B. The control unit 110 therefore determines a track with an associated speed profile that is to be followed by the vehicle 100 during the SAM. The vehicle is then controlled, e.g., by the control unit 110, to follow the determined track including the speed profile. However, the vehicle may likely not be able to exactly follow the track or maintain the exact desired speed. Rather, there will be some uncertainty in how well the vehicle will be able to follow a given planned maneuver track. This uncertainty is shown in FIG. 2 by the region 220 which illustrates a region within which the vehicle may end up if controlled to follow the planned path at the desired speed profile. The area and shape of this uncertainty region 220 is often associated with vehicle longitudinal velocity $v_x$ and lateral acceleration $a_y$.

Herein, 'safe' is given a broad interpretation. A safe maneuver or a safe vehicle state may be a maneuver or state in which the vehicle and/or vehicle occupant and/or other road user is not subject to risk in terms of injury or damage.

Some examples may be given of a safe condition and of an unsafe condition;

According to some aspects, a situation where a risk of collision is unlikely may be considered a safe state.

According to some other aspects, a situation where a risk of collision is not unlikely may still be considered a safe state depending on the object. I.e., colliding with a small bush or tree may be considered safe, while colliding with another vehicle or a larger object like a brick wall may be considered unsafe.

According to some further aspects, colliding with another vehicle where it has been determined beforehand, e.g., via vehicle-to-vehicle (V2V) communications, that a collision can be tolerated with low risk, may be considered safe.

According to aspects, a situation where the vehicle risks exiting a drivable area is considered unsafe.

According to other aspects, exiting a drivable area may be considered safe depending on the properties of the ground outside the drivable area, as discussed above.

A vehicle state is a collection of variables which together describe in what state the vehicle is currently in. Herein, vehicle state comprises variables associated with vehicle location (coordinates) and orientation (such as, e.g., heading, steering angle and articulation angle). The vehicle state also comprises information associated with vehicle dynamic state, i.e., vehicle velocity, acceleration, turn rate, and so on. The vehicle state is often represented as a vector of state variables x. As will be discussed in more detail below, an allowable vehicle state space may, in general, comprise both upper and lower limits on state variables such as lateral position for the duration of a maneuver.

The vehicle transitions between states based on issued control commands, e.g., braking commands or turning commands. Vehicle state can often be bounded to lie within some set with high probability.

Figure 6:
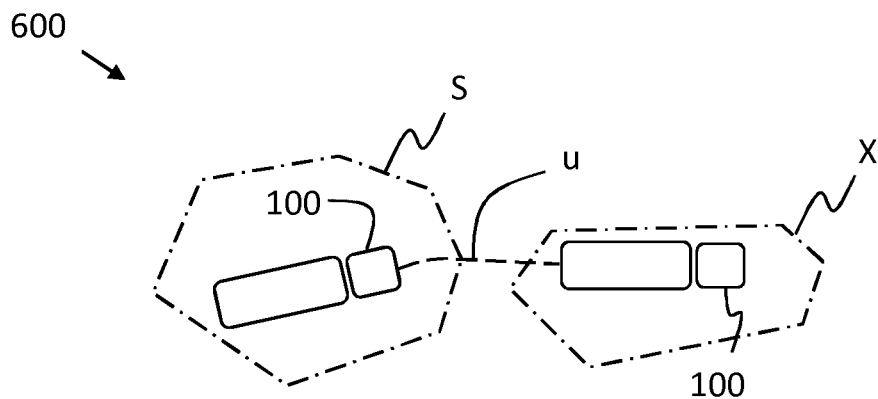
FIG. 6 shows bounded vehicle state sets.

With reference to FIG. 6, a vehicle 100 may currently be associated with a state x that is comprised in some set S of states, and wishes to transition into some other set of states X. The control unit 110 therefore issues a control command u. For a given target set X, a one-step robust controllable set (or preimage set) S is defined as the set of states that gets robustly mapped to X. Preimage sets were discussed by, e.g., F. Borrelli, A. Bemporad, and M. Morari, in "Predictive Control for linear and hybrid systems", Cambridge University Press, 2015, and will therefore not be discussed in more detail herein. The set S is the set of vehicle states for which there exist a control signal u (shown in FIG. 3) that transitions the vehicle state into a state comprised in the target set of states X, for all possible disturbances. The set of disturbances can be assumed bounded, or it can be assumed to be some set representing a fixed probability of occurrence. In other words, it can be ascertained using various known methods that the vehicle will transition into a state x comprised in the set of states X as a consequence of issuing the control signal u, starting from a set of vehicle states S. In order to be able to bound the set of disturbances, vehicle path following performance must be modelled.

Figure 3:
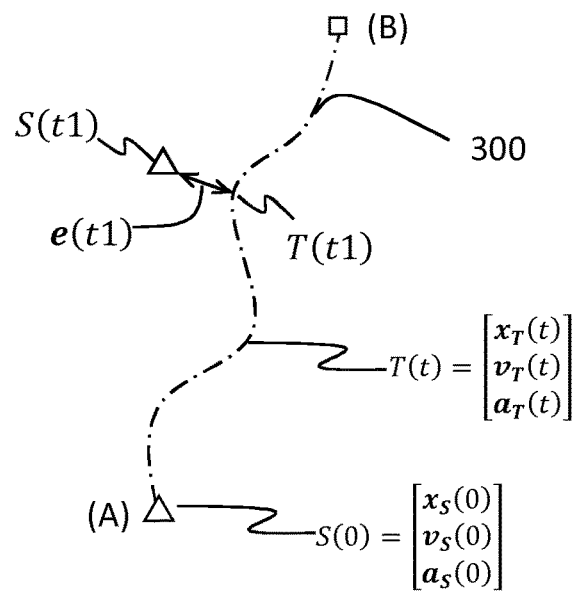
FIG. 3 shows an example path with a path following error.

FIG. 3 schematically illustrates a vehicle path 300. The vehicle path may, e.g., be associated with a planned SAM. The path starts at location point A at time t=0 with a vehicle initial state S(0) comprising an initial position vector $x_S(t)$, an initial velocity vector $v_S(t)$, and an initial acceleration vector $a_S(t)$. The track to be followed is defined by a sequence of target vehicle states T(t) as function of time t. Thus, at time t the vehicle is supposed to be in a target state T(t) comprising a target position vector $x_T(t)$, a target velocity vector $v_T(t)$, and a target acceleration vector $a_T(t)$. At any given time, e.g., at time t1, there will likely be a discrepancy between the target vehicle state T(t1) at time t1 and the actual vehicle state S(t1) at time t1. This discrepancy is herein denoted a track error e(t1), which can be used as a measure of path following performance. This measure can be sampled and used to characterize vehicle path following performance. If the path following performance can be bounded, at least with high probability, the uncertainty regions such as the region 220 in FIG. 2 can be determined.

Suppose densely sampled path following performance data has been obtained. Although it is possible to use this data directly to determine the occurrence rate for extreme instances of path following error or other discrepancies, it does not necessarily well capture the behavior of the vehicle. Instead, it is herein proposed to, optionally, filter the densely sampled data to extract a series of low dimensional aggregate samples describing the specific path following performance we are interested in modelling. For example, if the purpose is to quantify how often large lateral offsets occur when attempting to follow a given path, then aggregate samples could be formed by first detecting instances of lateral offset based on some criteria (e.g. thresholding), and then quantifying these instances using aggregate measures, e.g. a two dimensional sample consisting of maximum offset or threshold value and the duration of time the offset is above some threshold. A cumulative density function can also be used to describe aggregate behavior in terms of the relative percentage of time the offset is above some value. The densely sampled data can also be replaced by, e.g., block maxima, block means, or block median values determined for consecutive blocks of the densely sampled data, thus provided less dense sampled data.

Extreme value theory (EVT) is an area of statistics which focuses on properties of rare events. EVT is discussed in, e.g., C. Scarrott and A. MacDonald, "A review of extreme value threshold estimation and uncertainty quantification," REVSTAT Statistical Journal, vol. 10, no. 1, 2012, and references cited therein.

In probability theory and statistics, the generalized extreme value (GEV) distribution is a family of continuous probability distributions developed within extreme value theory to combine the Gumbel, Fréchet and Weibull families also known as type I, II and III extreme value distributions. By the extreme value theorem, the GEV distribution is the only possible limit distribution of properly normalized maxima of a sequence of independent and identically distributed random variables. It is noted that a limit distribution need not exist since this requires regularity conditions on the tail of the distribution. Despite this, the GEV distribution is often used as an approximation to model the maxima of long (finite) sequences of random variables. In some fields of application, the generalized extreme value distribution is known as the Fisher-Tippett distribution, named after Ronald Fisher and L. H. C. Tippett. However, usage of this name is sometimes restricted to mean the special case of the Gumbel distribution.

Peaks Over Threshold (POT) is a class of methods in EVT that model the extreme events that exceed some threshold. Under some assumptions the exceedances converge asymptotically to a so-called Generalized Pareto (GDP) distribution. For a specific data set, the exceedances can be used to estimate the parameters of a GDP distribution which in turn can be used to predict the likelihood of even rarer events. This enables statistical arguments on the limits of assumptions with significantly less data than traditional methods. The results from this analysis can also be used to verify that a set of assumptions does appear to hold true for the Operational Design Domain (ODD) where the data was collected. The ODD may, e.g., be characterized by maximum ego velocity, maximum road slope, maximum road banking, etc.

Furthermore, the assumptions can then be used when evaluating whether an ego vehicle can perform a certain action, i.e. is the action safe given the expected path following performance of the vehicle.

The parameters for the GEV and/or GDP distribution can also be used in order to create a monitor for certain aspects of the ODD, i.e. assumptions on vehicle path following performance. More specifically, if the current vehicle path following performance deviates from the GDP distribution (with more than a certain probability threshold), there is an indication of a risk that the ego vehicle is no longer within the defined ODD, and thus the ego vehicle may need to take precautionary measures.

The ODD monitor is also the reason why it is possible to argue that the system will remain safe over time with regards to changing vehicle path following performance. This is because the system will be able to detect changes in path following performance before an extreme event occurs, which could lead to an accident.

It is noted that a benefit of using the methodology proposed herein is that there is no explicit need to observe a path following errors where the assumptions are broken in order to detect that there is a risk that original ODD (i.e. original data collection) is no longer valid. It is enough to detect a distribution of semi rare events (these events are still within the ODD) which does not match the expected distribution.

Figure 4:
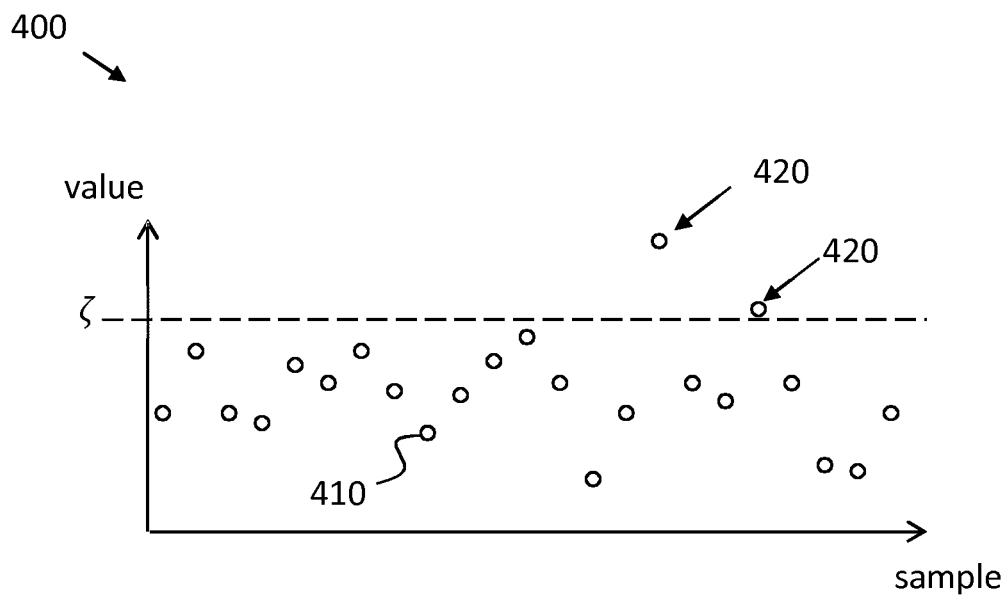
FIG. 4 shows an example thresholding operation.

FIG. 4 schematically illustrates a thresholding operation 400, where samples of path following performance 410, 420 have been collected. A threshold $\zeta$ is applied in order to select a subset of the path following performance samples such that the selected samples follow a pre-determined statistical extreme value distribution.

Figure 5:
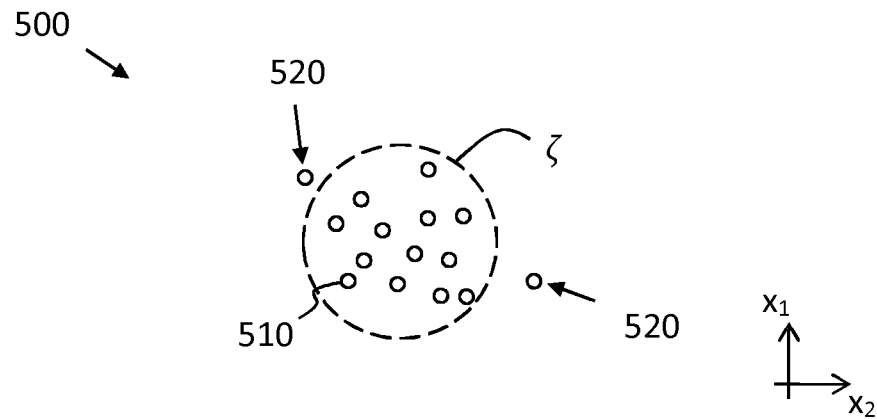
FIG. 5 shows another example thresholding operation.

FIG. 5 illustrates another thresholding operation, here in two dimensions $x_1$, $x_2$. Samples 510, 520 of path following performance have been collected. A threshold $\zeta$ is again applied in order to select a subset of the path following performance samples such that the selected samples follow a pre-determined statistical extreme value distribution.

Figure 7:
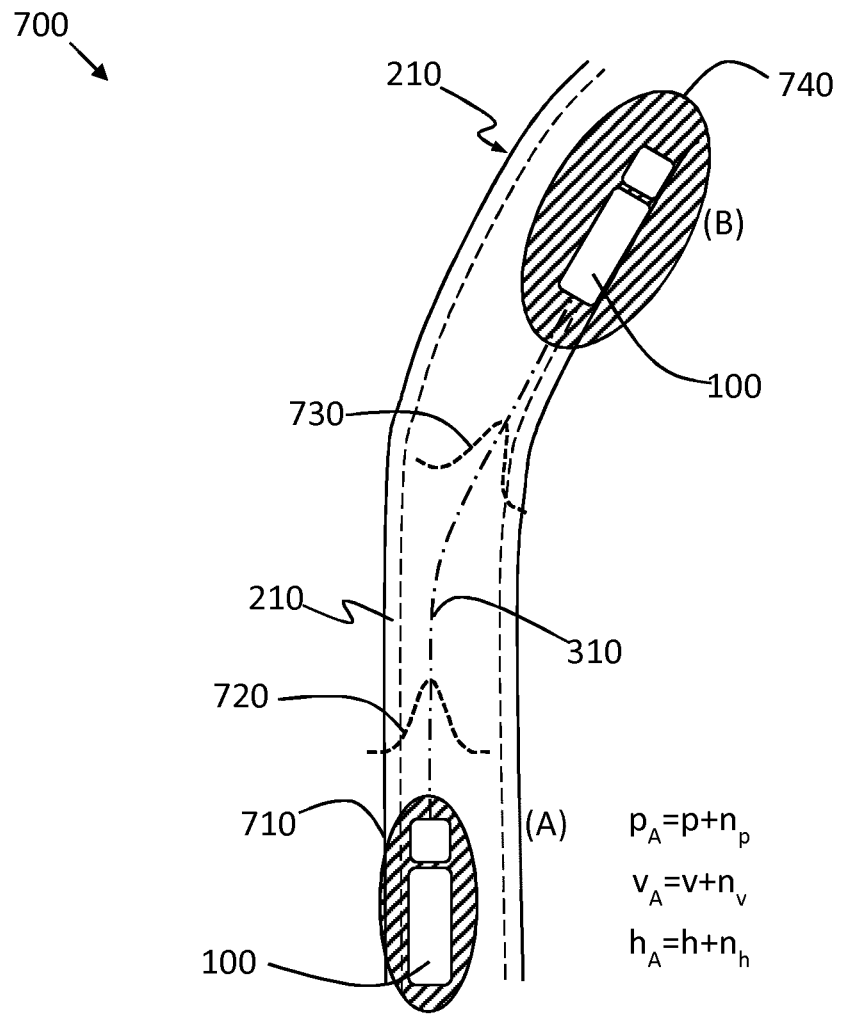
FIG. 7 schematically illustrates vehicle path following.

FIG. 7 illustrates an example 700 of quantifying vehicle path following performance. The vehicle 100 is initially at point A in a state associated with some bounded uncertainty 710. The vehicle state here comprises variables indicating heading $h_A$ with disturbance or uncertainty $n_h$, velocity $v_A$ with disturbance or uncertainty $n_v$, and position $p_A$ with disturbance or uncertainty $n_p$. The methods disclosed herein can be used to quantify vehicle path following performance, this means that the path following error 720, 730 when the vehicle attempts to follow a target track 310 can be bounded. This way, future vehicle states can be bounded to lie within sets 740 with high probability.

Figure 8:
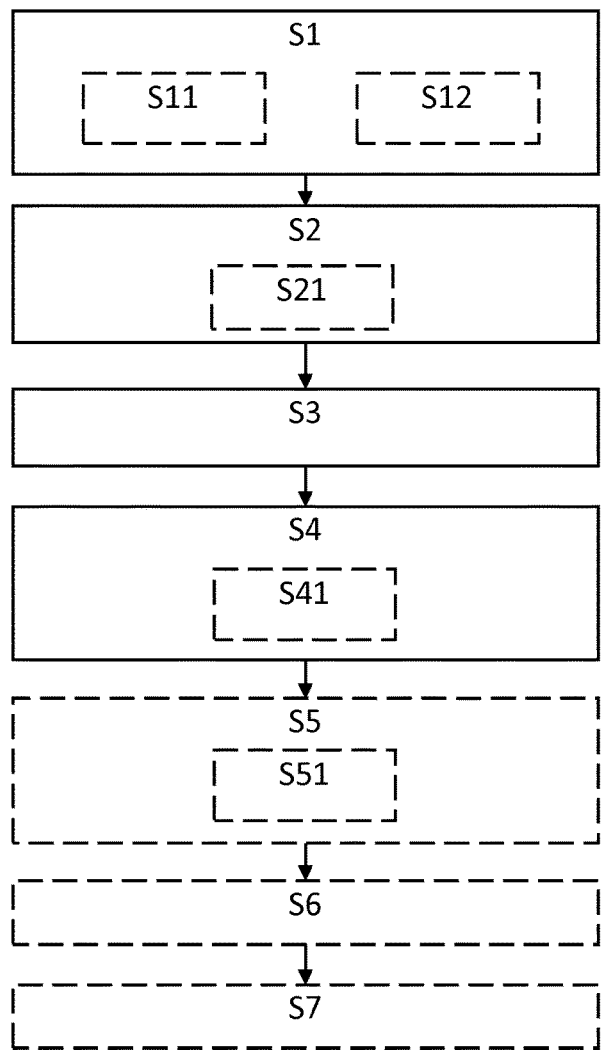
FIG. 8 is a flow chart illustrating methods.

FIG. 8 is a flow chart illustrating methods which summarize the discussions above. There is illustrated a method for quantifying vehicle path following performance. The method comprises obtaining S1 samples of path following performance $p_{i_{i=1}}^{n-1}$. The samples may, e.g., be obtained S11 as a previously stored set of samples or obtained S12 as a set of samples during operation of an ego vehicle 100.

A sample of path following performance may as discussed above comprise any of; lateral vehicle position, longitudinal vehicle position, absolute or squared vehicle position, lateral vehicle velocity, longitudinal vehicle velocity, absolute or squared vehicle velocity, lateral vehicle acceleration, longitudinal vehicle acceleration, absolute or squared vehicle acceleration, curvature, yaw rate, heading, and vehicle articulation angle. It is appreciated that this list is not exhaustive, further examples can be given.

According to some aspects, a sample of vehicle path following performance is determined separately for one or more parts of the vehicle. A vehicle part can be, e.g., a unit such as a trailer in a vehicle combination, or a vehicle part such as an axle or a pair of wheels.

According to some other aspects, a sample of vehicle path following performance is obtained dependent on any of; type of vehicle, type of vehicle combination, vehicle physical dimension parameters, weather condition, road friction, road geometry, and path trajectory geometry.

The method comprises selecting S2 a subset of the path following performance samples such that the selected samples follow a pre-determined statistical extreme value distribution. The pre-determined statistical extreme value distribution may, e.g., be a Generalized Pareto Distribution (GDP), or an instance of a Generalized Extreme Value distribution (GEV).

According to some aspects, the selecting comprises determining S21 a threshold $\zeta$ such that the samples of vehicle path following performance in excess of the threshold $\zeta$, $\{p_i: p_i \nleq \zeta\}$, follow the pre-determined statistical extreme value distribution. Some example thresholds were illustrated in FIGS. 4 and 5 above. The thresholds may be fixed or dynamically adjusted based on some performance criterion.

The method further comprises parameterizing S3 the pre-determined statistical extreme value distribution based on the selected samples of path following performance, and quantifying S4 vehicle path following performance based on the parameterized statistical extreme value distribution. Methods for extreme value distribution parameterization are known and will therefore not be discussed in more detail herein.

According to some aspects, the method comprises measuring S7 a time between exceedances metric indicating the time passed between vehicle path following performance samples exceeding the threshold $\zeta$, and monitoring ODD based on the time between exceedances metric. This way is can be determined if the vehicle is operating in its ODD, or if traffic situation conditions have changed so much that the vehicle 100 is no longer operating in the intended ODD.

According to some aspects, the method comprises comprising quantifying S41 the vehicle path following performance as a bounded model by bounding the performance to lie within a range $-\overline{w} \leq b_k \leq \overline{w}$ with probability greater than $1-\gamma$, based on the pre-determined statistical extreme value distribution.

According to some aspects, the method comprises determining S5 a confidence value $\beta$ associated with the pre-determined statistical extreme value distribution. The exceedances $b_i$: $b_i \not\leq \zeta$ can be used to estimate the parameters of the GDP or GEV (with corresponding confidence). The identified distribution can in turn be used to find bounds on vehicle path following performance which are fulfilled with a confidence $\beta$. The vehicle path following performance model has a verified correctness of $\gamma$ with confidence value which confidence value $\beta$ is associated with the parameterized GEV or GDP. Methods for determining the confidence value $\beta$ are known and will not be discussed in more detail herein. The confidence value depends at least in part on the number of observations collected over the threshold $\zeta$ and provides constructive feedback on the needed amount of data. This way, it can be estimated when a sufficient data set has been gathered for modelling path following performance, and when more data is needed. An advantage of the disclosed methods is therefore that they can be used to assess a sufficiency of gathered model data for model correctness verification based on the confidence value $\beta$ associated with the parameterized GEV or GDP. Thus, if the confidence value $\beta$ is too low after the GEV or GDP has been parameterized, then more data may be needed in order to increase the confidence value. In other words, according to some aspects, the method comprises assessing S51 a sufficiency of gathered vehicle path following performance data for quantification based on the confidence value $\beta$ associated with the pre-determined statistical extreme value distribution.

According to some other aspects, the method comprises monitoring S6 an operational design domain, ODD, associated with the vehicle by comparing the parameterized pre-determined statistical extreme value distribution to a set of baseline distribution parameters, wherein operation outside the ODD is indicated by a difference between parameterized pre-determined statistical extreme value distribution parameters and the baseline distribution parameters.

Although the described vehicle path following performance modelling may be performed off-line (i.e. in a design phase), the identified GDP or GEV distribution can also be used to construct monitors of the ODD for on-line use as well. In particular, if vehicle path following performance samples are collected online, the distribution of the exceedances can be monitored. A significantly different distribution of exceedances compared to the distribution that was obtained off-line indicates that the system is out of its ODD. In other words, by the disclosed techniques is becomes possible to monitor an ODD associated with the vehicle by comparing the parameterized GDP or GEV to a set of baseline GDP or GEV parameters. Operation outside the ODD is for instance indicated by a difference between parameterized GDP parameters and baseline GDP parameters. A warning signal or SAM may be triggered in case operation outside the ODD is detected.

A simple monitor of this kind is to calculate the return period (i.e. the average time between exceedances) over some time window. A significant decrease of the return period is then an indication that the vehicle is operated outside of its ODD.

Figure 9:
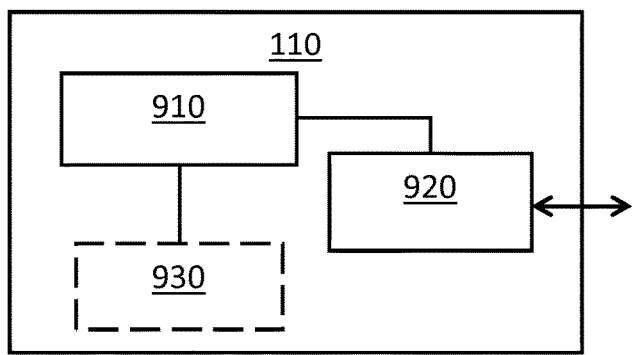
FIG. 9 schematically illustrates a control unit.

FIG. 9 schematically illustrates, in terms of a number of functional units, the components of the control unit 110 according to an embodiment of the discussions herein. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 110 to perform a set of operations, or steps, such as the methods discussed in connection to FIG. 4. For example, the storage medium 930 may store the set of operations, and the processing circuitry 910 may be configured to retrieve the set of operations from the storage medium 930 to cause the control unit 110 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 110 may further comprise an interface 920 for communications with at least one external device, such as the remote server 130 and/or on-board vehicle systems. As such the interface 920 may comprise one or more transmitters and receivers, comprising analogue and digital components and a suitable number ports for wireline or wireless communication.

The processing circuitry 910 controls the general operation of the control unit 110 e.g. by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
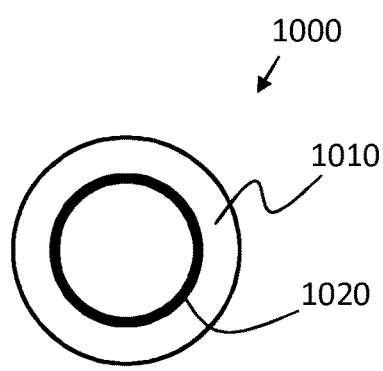
FIG. 10 shows an example computer program product.

FIG. 10 schematically illustrates a computer program product 1000, comprising a set of operations 1010 executable by the control unit 110. The set of operations 1010 may be loaded into the storage medium 930 in the control unit 110. The set of operations may correspond to the methods discussed above in connection to FIG. 6.

In the example of FIG. 10, the computer program product 1000 is illustrated as an optical disc, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program is here schematically shown as a track on the depicted optical disk, the computer program can be stored in any way which is suitable for the computer program product.

The invention claimed is:

1. A method performed by a control unit for controlling a vehicle based on a quantified vehicle path following performance, the method comprising;

obtaining samples of path following performance $p_{i_{j=1}}^{n-1}$, wherein path following performance $p_i$ is measured as a track error indicating a discrepancy between a target vehicle state and an actual vehicle state in following a vehicle path, selecting a subset of the path following performance samples such that the selected samples follow a pre-determined statistical extreme value distribution, parameterizing the pre-determined statistical extreme value distribution based on the selected samples of path following performance, quantifying vehicle path following performance based on the parameterized statistical extreme value distribution, and controlling the vehicle by the control unit based on the quantified vehicle path following performance.

2. The method according to claim 1, wherein the obtaining comprises obtaining a previously stored set of vehicle path following performance samples.

3. The method according to claim 1, wherein the obtaining comprises obtaining a set of vehicle path following performance samples during operation of an ego vehicle.

4. The method according to claim 1, wherein the selecting comprises determining a threshold $\zeta$ such that the samples of vehicle path following performance in excess of the threshold $\zeta$, $\{p_i: p_i \nless \zeta\}$, follow the pre-determined statistical extreme value distribution.

5. The method according to claim 4, comprising measuring a time between exceedances metric indicating the time passed between vehicle path following performance samples exceeding the threshold $\zeta$, and monitoring ODD based on the time between exceedances metric.

6. The method according to claim 1, wherein the pre-determined statistical extreme value distribution is a Generalized Pareto Distribution, GDP.

7. The method according to claim 1, wherein the pre-determined statistical extreme value distribution is a Generalized Extreme Value distribution, GEV.

8. The method according to claim 1, wherein a sample of vehicle path following performance comprises any of; lateral vehicle position, longitudinal vehicle position, absolute or squared vehicle position, lateral vehicle velocity, longitudinal vehicle velocity, absolute or squared vehicle velocity, lateral vehicle acceleration, longitudinal vehicle acceleration, absolute or squared vehicle acceleration, curvature, yaw rate, heading, articulation angle.

9. The method according to claim 8, wherein a sample of vehicle path following performance is determined separately for one or more parts of the vehicle.

10. The method according to claim 1, wherein a sample of vehicle path following performance is obtained dependent on any of; type of vehicle, type of vehicle combination, vehicle physical dimension parameters, weather condition, road friction, road geometry, and path trajectory geometry.

11. The method according to claim 1, comprising quantifying the vehicle path following performance as a bounded model by bounding the performance to lie within a range $-\overline{w} \leq b_k \leq \overline{w}$ with probability greater than $1-\gamma$, based on the pre-determined statistical extreme value distribution.

12. The method according to claim 1, comprising determining a confidence value $\beta$ associated with the pre-determined statistical extreme value distribution.

13. The method according to claim 12, comprising assessing a sufficiency of gathered vehicle path following performance data for performance quantification based on the confidence value $\beta$ associated with the pre-determined statistical extreme value distribution.

14. The method according to claim 1, comprising monitoring an operational design domain, ODD, associated with the vehicle by comparing the parameterized pre-determined statistical extreme value distribution to a set of baseline distribution parameters, wherein operation outside the ODD is indicated by a difference between parameterized pre-determined statistical extreme value distribution parameters and the baseline distribution parameters.

15. A non-transitory computer readable medium carrying a computer program comprising program code for performing the steps of claim 1 when said program product is run on a computer or on processing circuitry of a control unit.

16. A control unit for quantifying vehicle path following performance, the control unit being configured to perform the steps of the method according to claim 1.

17. A vehicle comprising a control unit according to claim 16.

* * * * *